(12) United States Patent
Xu et al.

(10) Patent No.: US 10,302,844 B2
(45) Date of Patent: May 28, 2019

(54) DISPLAY WITH BACKLIGHT RECYCLING STRUCTURES

(71) Applicant: Apple Inc., Cupertino, CA (US)

(72) Inventors: Ming Xu, Sunnyvale, CA (US); Cheng Chen, San Jose, CA (US); Hiroshi Osawa, Sunnyvale, CA (US); Yu Cheng Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 348 days.

(21) Appl. No.: 14/918,405

(22) Filed: Oct. 20, 2015

(65) Prior Publication Data

US 2016/0170129 A1    Jun. 16, 2016

Related U.S. Application Data

(60) Provisional application No. 62/092,680, filed on Dec. 16, 2014.

(51) Int. Cl.
*F21V 8/00* (2006.01)
*G02F 1/1335* (2006.01)
*G02F 1/1362* (2006.01)

(52) U.S. Cl.
CPC ..... *G02B 6/0055* (2013.01); *G02F 1/133553* (2013.01); *G02F 1/136209* (2013.01); *G02F 1/136286* (2013.01); *G02F 1/133512* (2013.01); *G02F 1/133615* (2013.01); *G02F 2001/133565* (2013.01)

(58) Field of Classification Search
CPC ......... G02F 1/133553; G02F 1/136209; G02F 1/133512; G02F 1/133555; G02F 1/136286; G02B 6/0055
See application file for complete search history.

(56) References Cited

U.S. PATENT DOCUMENTS

| | | | |
|---|---|---|---|
| 6,801,270 B2 | 10/2004 | Faris et al. | |
| 7,450,194 B2 | 11/2008 | Lazarev | |
| 7,557,879 B2 | 7/2009 | Chang et al. | |
| 7,815,355 B2 | 10/2010 | Thompson et al. | |
| 7,911,557 B2 | 3/2011 | Lazarev et al. | |
| 2006/0001814 A1* | 1/2006 | Paik | G02F 1/136209 349/141 |
| 2006/0146217 A1* | 7/2006 | Ahn | G02F 1/13458 349/43 |
| 2007/0236628 A1* | 10/2007 | Epstein | G02B 5/0242 349/67 |

(Continued)

*Primary Examiner* — Jessica M Merlin
(74) *Attorney, Agent, or Firm* — Treyz Law Group, P.C.; G. Victor Treyz; Joseph F. Guihan

(57) ABSTRACT

A display may have an array of pixels. The pixels may have color filter elements such as red, green, and blue color filter elements. A layer of opaque material may be used to form a black matrix. The black matrix may have openings that receive the color filter elements. A backlight unit may produce backlight illumination for the display. A reflector layer may be interposed between the black matrix and the backlight unit. The reflector layer may have openings aligned with the openings in the black matrix and the color filter elements and may overlap the black matrix. Some of the backlight from the backlight unit may pass through the color filter elements. Other backlight may by be recycled by being reflected off of the reflector layer, thereby enhancing backlight efficiency.

5 Claims, 9 Drawing Sheets

(56) References Cited

U.S. PATENT DOCUMENTS

| | | | |
|---|---|---|---|
| 2009/0009685 A1* | 1/2009 | No | G02F 1/133502 |
| | | | 349/62 |
| 2012/0162278 A1* | 6/2012 | Cheng | G09G 3/3607 |
| | | | 345/690 |
| 2014/0118656 A1* | 5/2014 | Jang | G02F 1/133528 |
| | | | 349/44 |

* cited by examiner

DISPLAY WITH BACKLIGHT RECYCLING STRUCTURES

This application claims the benefit of provisional patent application No. 62/092,680 filed on Dec. 16, 2014, which is hereby incorporated by reference herein in its entirety.

BACKGROUND

This relates generally to electronic devices, and more particularly, to electronic devices with displays.

Electronic devices often include displays. For example, cellular telephones and portable computers often include displays for presenting information to a user.

Liquid crystal displays contain a layer of liquid crystal material. Pixels in a liquid crystal display contain thin-film transistors and electrodes for applying electric fields to the liquid crystal material. A liquid crystal display includes substrate layers such as color filter layers and thin-film transistor layers. The liquid crystal layer of a liquid crystal layer is sandwiched between the substrate layers. Upper and lower polarizers are formed above and below the substrate layers. The strength of the electric field in each pixel controls the polarization state of the liquid crystal material associated with the pixel and thereby adjusts the brightness of the pixel.

The color filter layer in a liquid crystal display contains an array of color filter elements such as red, blue, and green elements and is used to provide the display with the ability to display color images. The thin-film transistor layer contains thin-film transistor circuitry that forms thin-film transistors and electrodes for the pixels.

A display may have a backlight unit that provides backlight illumination for the pixels. Backlight from the backlight unit travels outwardly through the layers of the display. White backlight that has been modulated in intensity using the liquid crystal layer, thin-film transistor circuitry, polarizers, and other display layers is converted to colored light as the white light passes through the color filter elements.

The color filter elements are typically formed within openings in a black matrix. The black matrix is a grid of opaque material that blocks stray light between adjacent pixels and hides underlying signal lines from view. The black matrix can help reduce color mixing between adjacent pixels and can reduce signal line visibility, but also absorbs a fraction of the backlight in the display, thereby reducing backlight efficiency. Low backlight efficiency can lead to excessive power consumption and reduced battery life in battery-powered devices.

It would therefore be desirable to be able to provide a display with improved backlight efficiency.

SUMMARY

A display may have an array of pixels. The pixels may be formed from liquid crystal display structures such as a color filter layer, liquid crystal layer, thin-film transistor layer, and polarizer layers.

The color filter layer may have color filter elements such as red, green, and blue color filter elements that are associated with respective pixels. A layer of opaque material may be used to form a black matrix. The black matrix may have openings that receive the color filter elements.

A backlight unit may produce backlight for the display. The backlight may pass outwards through the liquid crystal display structures.

A reflector layer may be interposed between the black matrix and the backlight unit. The reflector layer may have openings aligned with the openings in the black matrix and the color filter elements and may overlap the black matrix. Some of the backlight from the backlight unit may pass through the color filter elements. Other backlight may by be recycled by being reflected off of the reflector layer towards the backlight unit, thereby enhancing backlight efficiency.

DETAILED DESCRIPTION

Electronic devices may include displays. The displays may be used to display images to a user. Illustrative electronic devices that may be provided with displays are shown in FIGS. 1, 2, 3, and 4.

Figure 1:
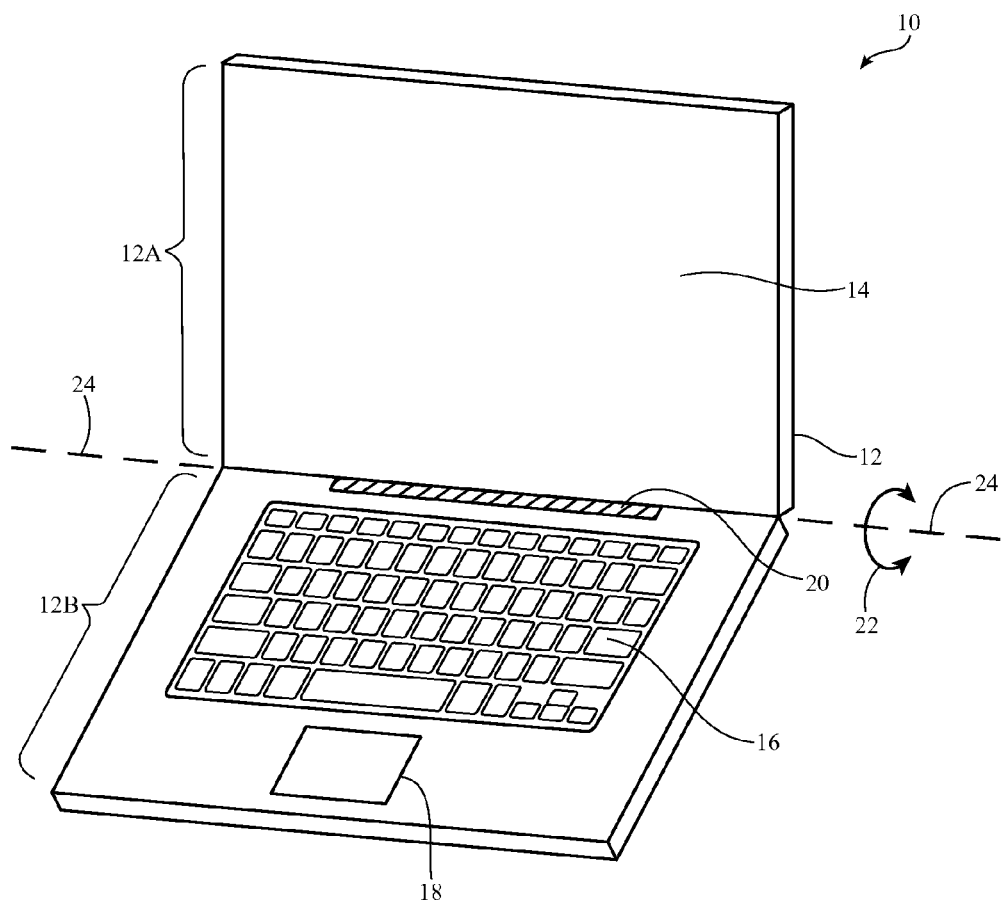
FIG. 1 is a perspective view of an illustrative electronic device such as a laptop computer with a display in accordance with an embodiment.

FIG. 1 shows how electronic device 10 may have the shape of a laptop computer having upper housing 12A and lower housing 12B with components such as keyboard 16 and touchpad 18. Device 10 may have hinge structures 20 that allow upper housing 12A to rotate in directions 22 about rotational axis 24 relative to lower housing 12B. Display 14 may be mounted in upper housing 12A. Upper housing 12A, which may sometimes referred to as a display housing or lid, may be placed in a closed position by rotating upper housing 12A towards lower housing 12B about rotational axis 24.

Figure 2:
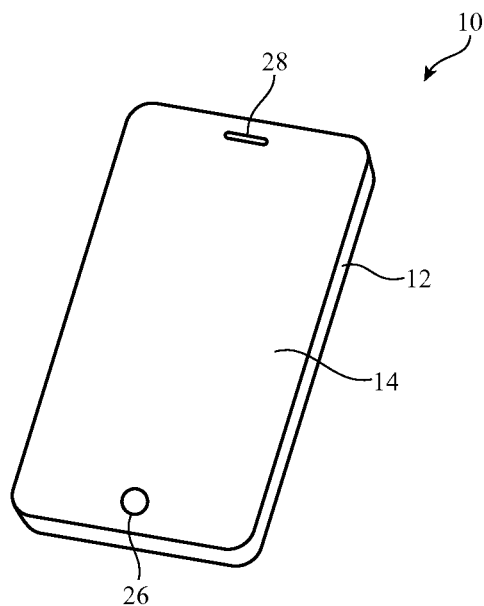
FIG. 2 is a perspective view of an illustrative electronic device such as a handheld electronic device with a display in accordance with an embodiment.

FIG. 2 shows how electronic device 10 may be a handheld device such as a cellular telephone, music player, gaming device, navigation unit, or other compact device. In this type of configuration for device 10, housing 12 may have opposing front and rear surfaces. Display 14 may be mounted on a front face of housing 12. Display 14 may, if desired, have openings for components such as button 26. Openings may also be formed in display 14 to accommodate a speaker port (see, e.g., speaker port 28 of FIG. 2).

Figure 3:
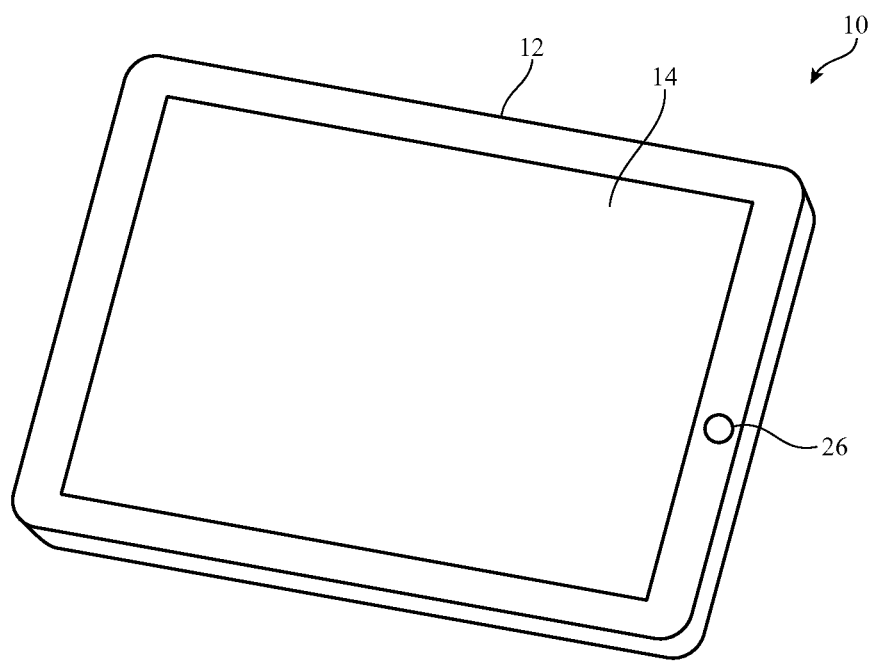
FIG. 3 is a perspective view of an illustrative electronic device such as a tablet computer with a display in accordance with an embodiment.

FIG. 3 shows how electronic device 10 may be a tablet computer. In electronic device 10 of FIG. 3, housing 12 may have opposing planar front and rear surfaces. Display 14 may be mounted on the front surface of housing 12. As shown in FIG. 3, display 14 may have an opening to accommodate button 26 (as an example).

Figure 4:
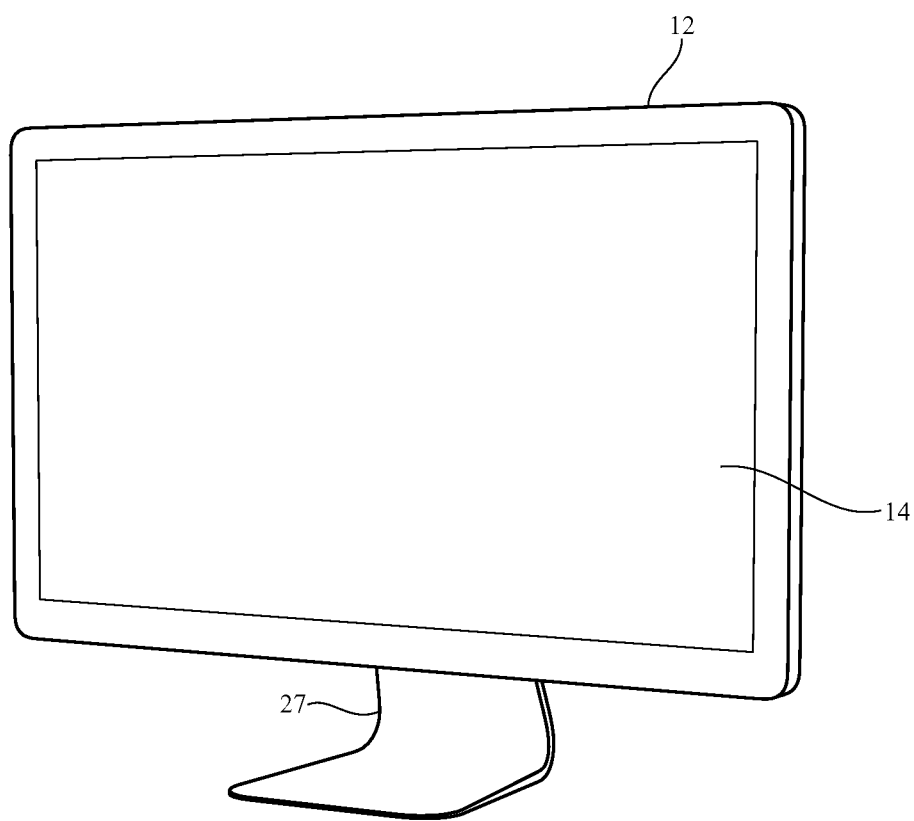
FIG. 4 is a perspective view of an illustrative electronic device such as a computer display with display structures in accordance with an embodiment.

FIG. 4 shows how electronic device 10 may be a computer display or a computer that has been integrated into a computer display. With this type of arrangement, housing 12 for device 10 may be mounted on a support structure such as stand 27 or stand 27 may be omitted (e.g., to mount device 10 on a wall). Display 14 may be mounted on a front face of housing 12.

The illustrative configurations for device 10 that are shown in FIGS. 1, 2, 3, and 4 are merely illustrative. In general, electronic device 10 may be a laptop computer, a computer monitor containing an embedded computer, a tablet computer, a cellular telephone, a media player, or other handheld or portable electronic device, a smaller device such as a wrist-watch device, a pendant device, a headphone or earpiece device, or other wearable or miniature device, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

Housing 12 of device 10, which is sometimes referred to as a case, may be formed of materials such as plastic, glass, ceramics, carbon-fiber composites and other fiber-based composites, metal (e.g., machined aluminum, stainless steel, or other metals), other materials, or a combination of these materials. Device 10 may be formed using a unibody construction in which most or all of housing 12 is formed from a single structural element (e.g., a piece of machined metal or a piece of molded plastic) or may be formed from multiple housing structures (e.g., outer housing structures that have been mounted to internal frame elements or other internal housing structures).

Display 14 may be a touch sensitive display that includes a touch sensor or may be insensitive to touch. Touch sensors for display 14 may be formed from an array of capacitive touch sensor electrodes, a resistive touch array, touch sensor structures based on acoustic touch, optical touch, or force-based touch technologies, or other suitable touch sensor components.

Display 14 for device 10 includes an array of pixels. The array of pixels may be formed from liquid crystal display (LCD) components or other suitable display structures. Configurations based on liquid crystal display structures are sometimes described herein as an example.

A display cover layer may cover the surface of display 14 or a display layer such as a color filter layer, thin-film transistor layer, or other portion of a display may be used as the outermost (or nearly outermost) layer in display 14. The outermost display layer may be formed from a transparent glass sheet, a clear plastic layer, or other transparent member.

Figure 5:
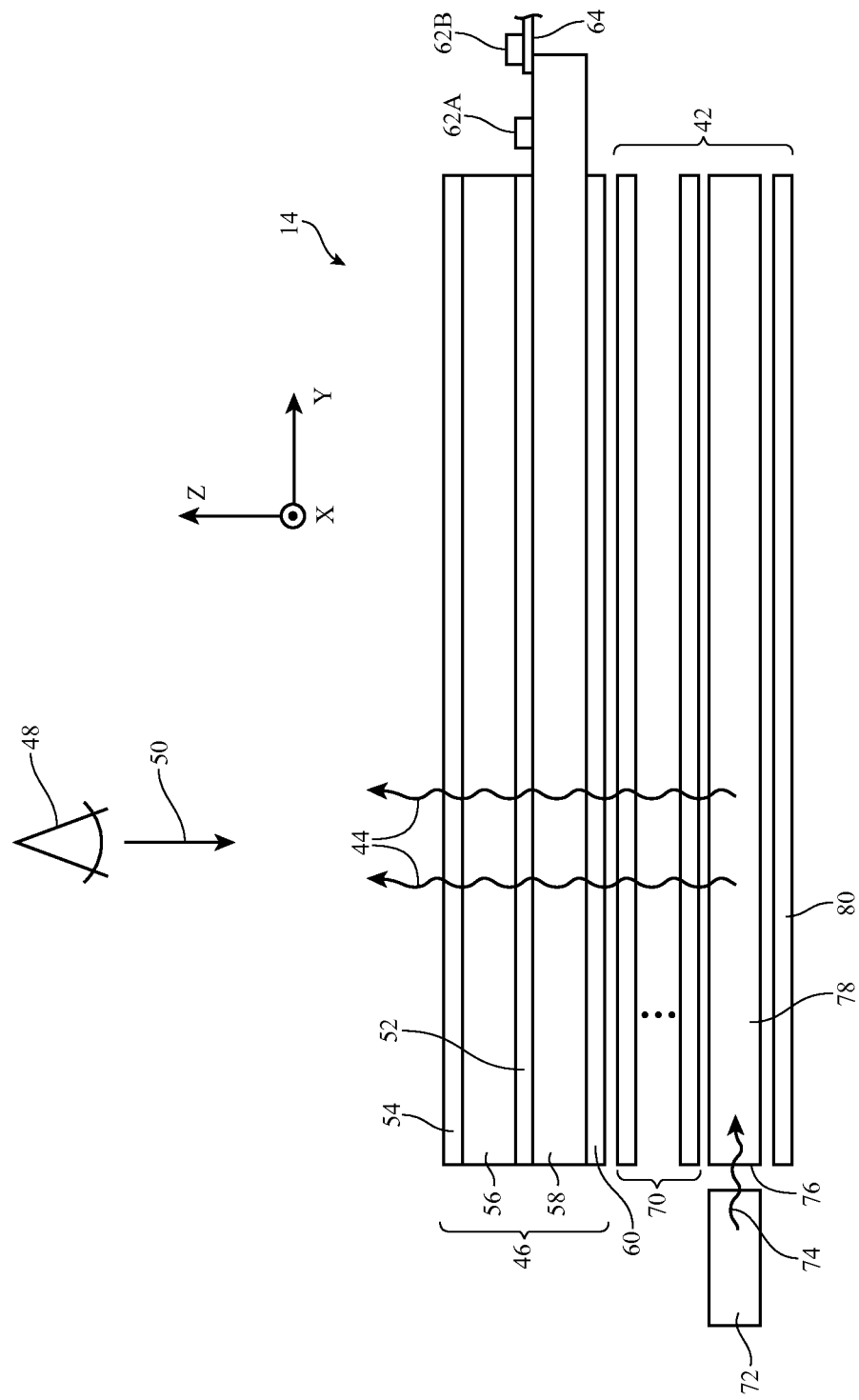
FIG. 5 is a cross-sectional side view of an illustrative display in accordance with an embodiment.

A cross-sectional side view of an illustrative configuration for display 14 of device 10 (e.g., for display 14 of the devices of FIG. 1, FIG. 2, FIG. 3, FIG. 4 or other suitable electronic devices) is shown in FIG. 5. As shown in FIG. 5, display 14 may include backlight structures such as backlight unit 42 for producing backlight 44. During operation, backlight 44 travels outwards (vertically upwards in dimension Z in the orientation of FIG. 5) and passes through pixel structures in display layers 46. This illuminates any images that are being produced by the pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion in housing 12). Display layers 46 may form a liquid crystal display or may be used in forming displays of other types.

In a configuration in which display layers 46 are used in forming a liquid crystal display, display layers 46 may include a liquid crystal layer such a liquid crystal layer 52. Liquid crystal layer 52 may be sandwiched between display layers such as display layers 58 and 56. Layers 56 and 58 may be interposed between lower polarizer layer 60 and upper polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, layer 58 may be a thin-film transistor layer that includes an array of pixel circuits based on thin-film transistors and associated electrodes (pixel electrodes) for applying electric fields to liquid crystal layer 52 and thereby displaying images on display 14. Layer 56 may be a color filter layer that includes an array of color filter elements for providing display 14 with the ability to display color images. If desired, layer 58 may be a color filter layer and layer 56 may be a thin-film transistor layer. Configurations in which color filter elements are combined with thin-film transistor structures on a common substrate layer may also be used.

During operation of display 14 in device 10, control circuitry (e.g., one or more integrated circuits on a printed circuit) may be used to generate information to be displayed on display 14 (e.g., display data). The information to be displayed may be conveyed to a display driver integrated circuit such as circuit 62A or 62B using a signal path such as a signal path formed from conductive metal traces in a rigid or flexible printed circuit such as printed circuit 64 (as an example).

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78. Light source 72 may be located at the left of light guide plate 78 as shown in FIG. 5 or may be located along the right edge of plate 78 and/or other edges of plate 78.

Light 74 that scatters upwards in direction Z from light guide plate 78 may serve as backlight 44 for display 14. Light 74 that scatters downwards may be reflected back in the upward direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films or prism films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may each have a matching rectangular footprint. If desired, compensation films and other optical films may be formed within the polarizer layers of display 14 or may be incorporated elsewhere in display 14.

Figure 6:
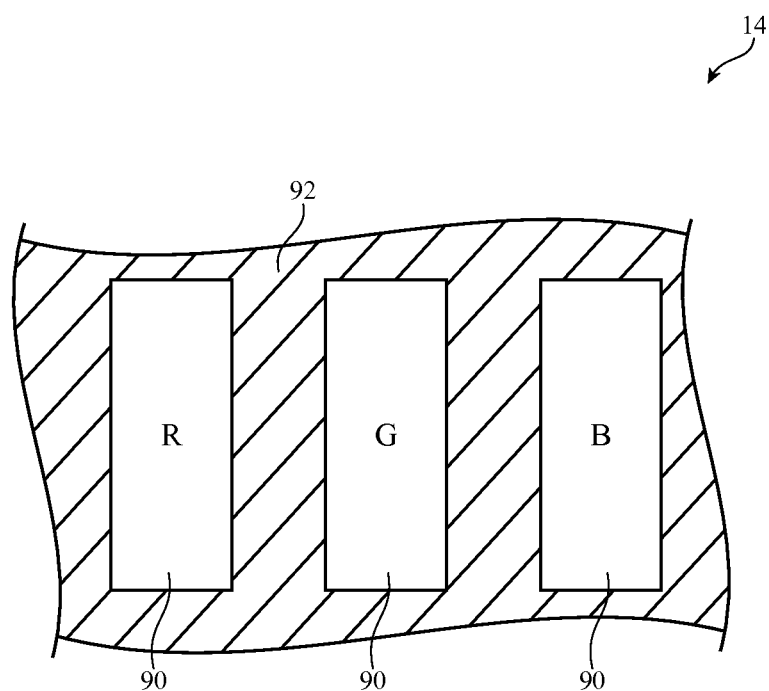
FIG. 6 is a top view of a portion of an illustrative display in accordance with an embodiment.

FIG. 6 is a top view of a portion of display 14 showing how display 14 may have an array of pixels 90. Pixels 90 may have color filter elements of different colors such as red color filter elements R, green color filter elements G, and blue color filter elements B. Black matrix 92 may have a grid shape with openings to accommodate the red, green, and blue color filter elements. The color filter elements may be rectangular (as shown in FIG. 6), may have chevron shapes, or may have other shapes. Black matrix 92 may be formed from black polymer or other opaque masking material.

The presence of black matrix 92 helps prevent stray backlight that is associated with a pixel of one color from passing through the color filter element of an adjacent pixel of another color and helps prevent metal signal lines in thin-film transistor layer 58 from being visible from the front of display 14. Because black matrix 92 is opaque, the presence of black matrix 92 blocks a portion of backlight 44 and thereby reduces backlight efficiency.

Figure 7:
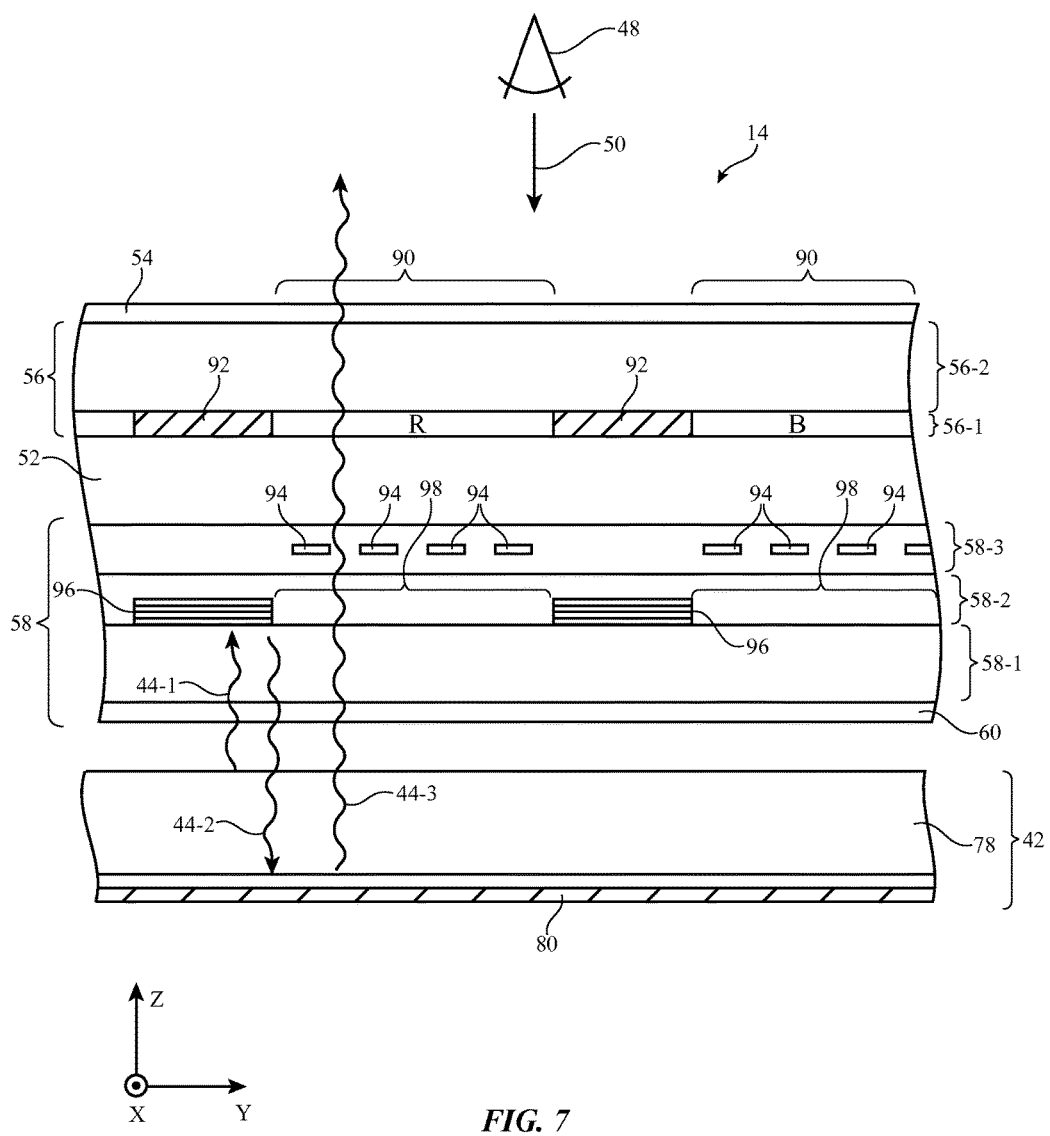
FIG. 7 is a cross-sectional side view of an illustrative display with reflector structures on a lower substrate layer such as a thin-film transistor substrate layer to enhance backlight efficiency in accordance with an embodiment.

To enhance backlight efficiency, reflective structures may be incorporated into display 14 that recycle the backlight that would otherwise be blocked by black matrix 92. Consider, as an example, the cross-sectional side view of FIG. 7. As shown in FIG. 7, display 14 may have an upper polarizer layer such as upper polarizer 54 and a lower polarizer layer such as lower polarizer 60. Layer 56 (e.g., a color filter layer or other upper substrate layer) may be interposed between polarizer 54 and liquid crystal layer 52. Layer 58 (e.g., a thin-film transistor layer or other lower substrate layer) may be interposed between polarizer 60 and liquid crystal layer 52.

Layer 56 may be a color filter layer having layers such as transparent substrate layer 56-2 and a layer of color filter elements such as color filter element layer 56-1. Transparent substrate layer 56-2 may be a layer of clear glass, plastic, or other transparent material. Color filter element layer 56-1 may have an array of color filter elements such as red color filter elements R, green color filter elements G, and blue color filter elements B. Color filter element layer 56-1 may also include black matrix 92. Black matrix 92 may have a grid shape or other shape with openings that receive the color filter elements (i.e., the red elements R, green elements G, and blue elements B) of pixels 90.

Layer 58 may be a thin-film transistor layer having layers such as transparent substrate layer 58-1, planarization layer 58-2, and thin-film transistor circuitry layer 58-3. Substrate layer 58-1 may be a layer of clear glass, plastic, or other transparent material. Thin-film transistor circuitry layer 58-3 may include thin-film transistors (e.g., transistors with polysilicon channel regions, semiconducting-oxide channel regions, or other thin-film semiconductor channel regions). As shown in FIG. 7, the circuitry of layer 58-3 may include pixel electrodes 94 associated with each pixel 90 for applying electric fields to the portion of liquid crystal layer 52 that is above electrodes 94. Light that passes through these portions of display 14 may be modulated in intensity by controlling the strength of the applied electric field.

Reflector structures such as reflector layer 96 may be provided under black matrix 92. Reflector layer 96 may have the same layout as black matrix 92 (or a similar layout). For example, if black matrix 92 has a grid shape with chevron-shaped openings to accommodate chevron-shaped color filter elements, reflector layer 96 may have the same grid shape and matching chevron-shaped openings 98. With arrangements such as these, black matrix 92 and reflector layer 96 overlap each other and openings 98 in reflector layer 96 are aligned with the openings in black matrix 92.

Reflector layer 96 may be formed from reflective materials such as a layer of reflective metal or a dielectric stack with alternating high-index-of-refraction and low-index-of-refraction layers. The layers in the dielectric stack may be organic layers such as polymer films and/or may be inorganic layers (e.g., silicon oxide, magnesium fluoride, silicon nitride, metal oxides such as aluminum oxide, etc.). Reflector layer 96 may be deposited through a shadow mask, may be patterned using photolithography, or may be formed using other suitable deposition and patterning techniques. The reflectivity of reflector layer 96 is preferably 80% or greater or is 90% or greater.

Reflector layer 96 reflects the portion of backlight 44 that would otherwise be absorbed by black matrix layer 92 back into backlight 42, so that this backlight is not wasted. As shown in FIG. 7, for example, a ray of backlight 44 such as backlight ray 44-1 may be emitted upwards from backlight unit 42 in direction Z. In the absence of reflector layer 96, backlight rays such as ray 44-1 that are emitted underneath black matrix 92 would strike black matrix 92 and be absorbed and/or scattered by black matrix 92. These backlight rays would therefore be lost and not used in producing illumination for display 14. In the presence of reflector layer 96, however, rays such as backlight ray 44-1 are reflected off of the underside of reflector layer 96 in downwards direction −Z, as shown by illustrative reflected backlight ray 44-2. Rays such as ray 44-2 that are directed back into light guide plate 42 are effectively recycled and are not lost by absorption in matrix 92. As shown by light ray 44-3, recycled light such as reflected backlight ray 44-2 may be reflected back upwards in direction Z by the structures of backlight unit 42 (e.g., reflector layer 80). In the example of FIG. 7, backlight ray 44-3 is not blocked by black matrix 92 or reflector layer 96 and therefore passes through opening 98 in reflector layer 96 and the red color filter layer R in color filter element layer 56-1 to viewer 48.

As this example demonstrates, the presence of reflector layer 96 does not block the outgoing backlight rays that are aligned with the color filter elements (R, G, B) of pixels 90 and effectively recycles outgoing backlight rays that are aligned with black matrix 92. Backlight that would otherwise be unused in providing illumination for display 14 is reflected back into backlight unit 42 and is subsequently emitted from backlight unit 42 in direction Z for use in providing illumination. This ability to recycle backlight that would otherwise be blocked by opaque masking layer structures surrounding the color filter elements such as black matrix 92 improves the backlight efficiency of display 14 and thereby reduces the power consumption associated with powering light source 72.

In the illustrative configuration of FIG. 7, reflector layer 96 is formed on the upper surface of substrate layer 58-1. Planarization layer 58-2 may be used to planarize layer 58. Planarization layer 58-2 may smooth out any surface irregularities produced by reflector layer 96, so that subsequent layers such as thin-film circuitry layer 58-3 can be formed for layer 58. Planarization layer 58-2 may be a layer of spin-on-glass or other planarization layer that is compatible with elevated processing temperatures (e.g., the processing temperatures associated with forming thin-film transistor circuitry layer 58-1 on planarization layer 58-2).

Figure 8:
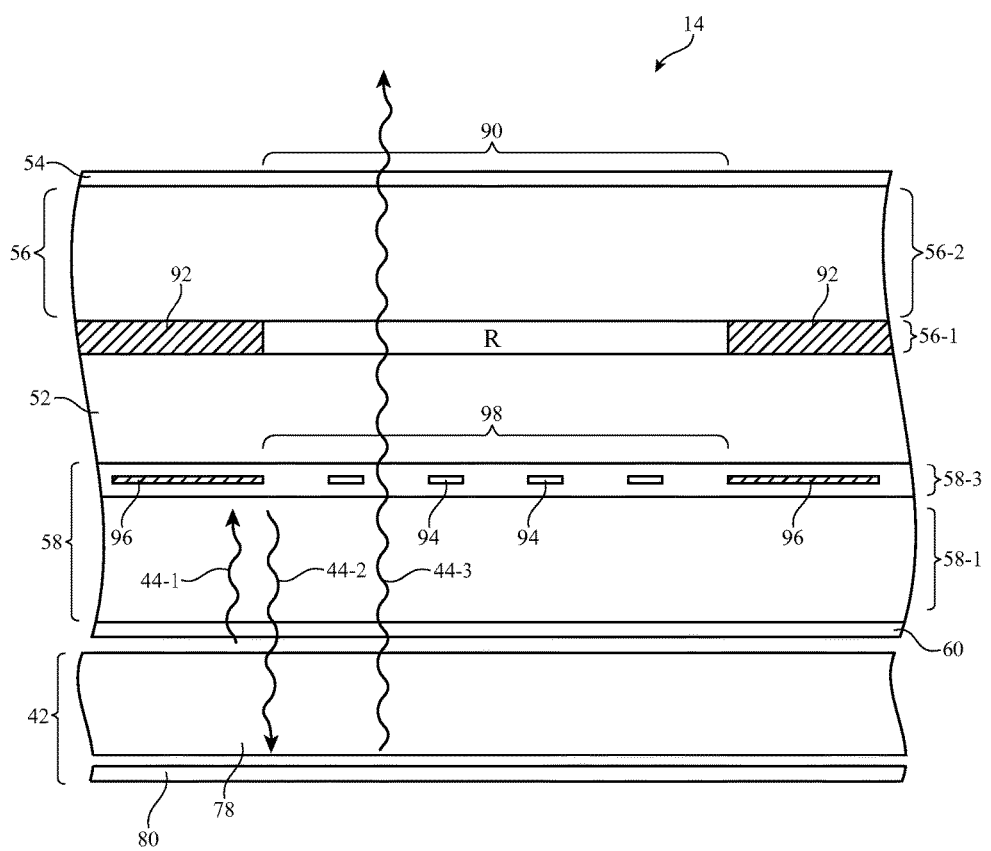
FIG. 8 is a cross-sectional side view of an illustrative display with reflective metal structures formed within a layer of thin-film transistor circuitry to enhance backlight efficiency in accordance with an embodiment.

If desired, reflector layer 96 may be formed within other layers in display 14. As shown in FIG. 8, for example, reflector layer 96 may be formed as part of thin-film transistor circuitry layer 58-3 by forming metal structures or other reflective structures within layer 58-3 that lie in the area of display outside of pixels 90 and color filter elements R, G, and B. With an arrangement of the type shown in FIG. 8, color filter element layer 56-1 is formed on the lower (inner) surface of transparent substrate layer 56-2. Color filter element layer 56-1 may include black matrix 92 and color filter elements such as red, green, and blue color filter elements (R, G, B). Reflector layer 96 may be formed from one or more metal layers in thin-film transistor circuitry layer 58-3. Openings 98 in reflector layer 96 may be aligned with corresponding openings in black matrix 92 in which the color filter elements are formed (i.e., reflector layer 96 and black matrix 92 may overlap each other and may have matching shapes).

Liquid crystal layer 52 may be interposed between layer 56 and layer 58. Layer 58 may have substrate layer 58-1 on which thin-film transistor circuitry layer 58-3 is formed. Layers 56 and 58 and liquid crystal layer 52 may be sandwiched between lower polarizer layer 60 and upper polarizer layer 54.

Backlight structures such as backlight unit 42 may generate backlight for display 14 of FIG. 8. Backlight rays such a ray 44-1 that would be blocked by black matrix 92 in a display without reflective layer 96 may instead be reflected downwards by layer 96 in direction −Z towards backlight unit 42 (see, e.g., ray 44-2). Backlight unit 42 contains structures such as reflector 80 that reflect rays such a ray 44-2 back in upwards direction Z through opening 98 in reflector layer 96 and black matrix 92, as illustrated by ray 44-3. The use of reflector layer 96 therefore helps enhance backlight efficiency.

Figure 9:
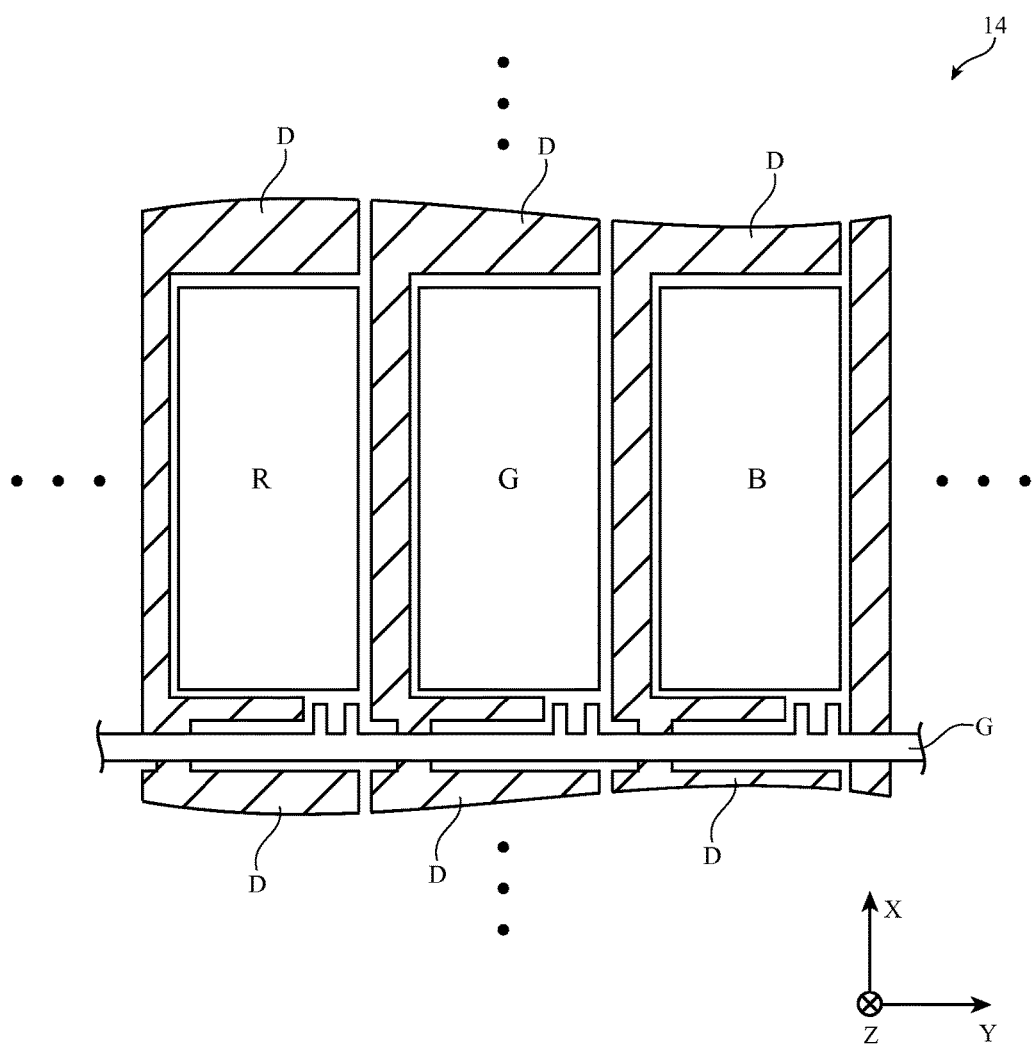
FIG. 9 is a bottom view of an illustrative display of the type shown in FIG. 8 in which metal lines within thin-film transistor circuitry such as data lines and gate lines have been patterned to form a reflector structure in accordance with an embodiment.

The reflective material that forms reflector layer 96 in a configuration of the type shown in FIG. 8 may be formed from metal signal traces in thin-film transistor circuitry layer 58-3 that have been enlarged to serve as a reflector for recycling backlight 44. In general, any suitable signal lines or other metal layers in circuitry 58-3 may be used as reflective structures. For example, reflector layer 96 of FIG. 8 may be formed from a light shielding layer that is also used to prevent backlight from reaching thin-film transistor gates in layer 58-3, a gate metal layer, a data line layer, a gate line layer, an extra metal layer (e.g., a third metal layer) that is used to cover a common voltage (Vcom) electrode formed from indium tin oxide, etc. Overlap between signal lines may, if desired, be minimized to avoid creating excessive parasitic capacitances. Metals such as aluminum, tungsten, molybdenum, titanium, and/or other metals may be used in forming reflector layer 96. The reflective metal that forms reflector layer 96 of FIG. 8 preferably occupies 80% or more, 90% or more, or 95% or more of the area of display that is not occupied by color filter elements R, G, and B to enhance reflectivity for backlight 44 (i.e., to ensure that the reflectivity of layer 96 is more than 80%, more than 90%, or is more than 95%, or other suitable value that enhances backlight recycling). FIG. 9 is a bottom view of an illustrative display in which metal lines such as a data line D and gate lines G have been patterned to form a reflective structure in accordance with an embodiment (i.e., an arrangement in which data lines D have been enlarged to surround the color filter elements and thereby enhance reflectivity). Other metal layers may be used in forming reflector layer 96 within thin-film circuitry layer 58-3 if desired.

Figure 10:
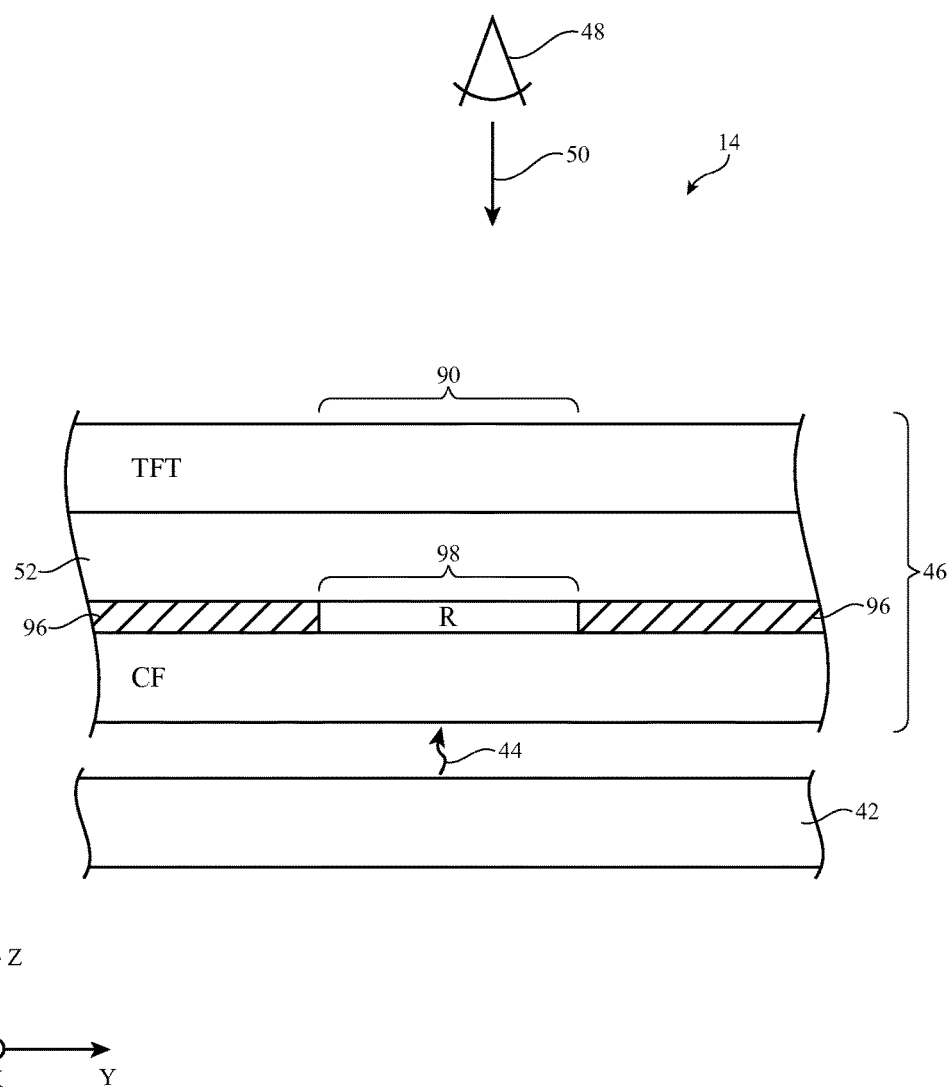
FIG. 10 is a cross-sectional side view of an illustrative display in which a reflector layer has been deposited on the surface of a color filter layer and provided with openings to receive color filter elements in accordance with an embodiment.

As shown in the cross-sectional side view of display 14 of FIG. 10, the thin-film transistor layer in display 14 may be located on top of the color filter layer (i.e., the thin-film transistor layer may be interposed between the color filter layer and viewer 48). As shown FIG. 10, color filter layer substrate CF is interposed between liquid crystal layer 52 and backlight unit 42. Light 44 may pass through the color filter layer before passing through liquid crystal layer 52 and thin-film transistor layer TFT to reach viewer 48. In this type of arrangement, reflector layer 96 may be formed directly on the outermost surface of the glass or other material of color filter substrate CF. Reflector layer 96 may have openings 98 that receive respective color filter elements R, G, and B. Polarizer layers may be formed on the top and bottom of layers 46.

If desired, additional layers of material may be incorporated into display 14. For example, display 14 may include one or more planarization layers, buffer layers, antireflection layers, antiscratch layers, antismudge layers, and other functional layers. Moreover, reflector layer 96 may be formed in other locations of display 14. Reflector layer 96 may, as an example, be formed under black matrix, on other substrate surfaces, on a separate reflector layer substrate, on a substrate layer or other layer that forms part of a display in which color filter elements and thin-film transistor circuitry are supported on the same substrate, or any other suitable location. The configurations of FIGS. 7, 8, 9, and 10 are merely illustrative.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    backlight structures that emit backlight;
    liquid crystal display layers that form pixels through which the backlight passes, wherein the liquid crystal display layers include a thin-film transistor layer having gate lines and data lines, a color filter layer having a plurality of color filter elements for the pixels, and a liquid crystal layer interposed between the thin-film transistor layer and the color filter layer; and
    a reflector layer with openings aligned with the pixels, wherein the reflector layer is interposed between the backlight structure and at least some of the liquid crystal display layers, wherein the reflector layer reflects some of the backlight towards the backlight structures, wherein the reflector layer includes the gate lines and the data lines, wherein the gate lines and the data lines occupy more than 80% of an area of the display that is not occupied by the plurality of color filter elements, wherein a data line of the data lines has locally widened portions and at least partially surrounds a color filter element of the plurality of color filter elements on at least three sides, wherein the data line has a first portion that extends between first and second adjacent color filter elements, wherein the first portion has a first length along a first axis and a first width along a second axis that is perpendicular to the first axis, wherein the first width is smaller than the first length, wherein the data line has a second portion that has a second width along a third axis that is parallel to the second axis, wherein the second width is longer than the first width, and wherein the second width is longer than a width of the first color filter element.

2. The display defined in claim 1, wherein the gate lines and the data lines occupy more than 90% of the area of the display that is not occupied by the plurality of color filter elements.

3. The display defined in claim 1, wherein the gate lines and the data lines occupy more than 95% of the area of the display that is not occupied by the plurality of color filter elements.

4. A display having pixels, comprising:

a color filter layer having a color filter layer substrate on which a plurality of color filter elements are formed for the pixels;

a layer of thin-film transistor circuitry that includes a plurality of data lines;

a backlight unit that emits backlight; and a reflector layer having openings aligned with the color filter elements, so that wherein some of the backlight passes through the color filter elements and so that some of the backlight is reflected from the reflector layer towards the backlight unit, wherein the reflector layer includes the plurality of data lines, wherein a data line of the plurality of data lines has locally widened portions and at least partially surrounds a color filter element of the plurality of color filter elements on at least three sides, wherein the color filter element has a first length and a first width, wherein the data line has a second length that is greater than the first length, and wherein one of the locally widened portions of the data line has a second width that is greater than the first width.

5. The display defined in claim 4, wherein the reflector layer occupies more than 80% of an area of the display that is not occupied by the plurality of color filter elements.

* * * * *